US009017841B2

(12) United States Patent
Chang et al.

(10) Patent No.: US 9,017,841 B2
(45) Date of Patent: *Apr. 28, 2015

(54) ELECTROCHEMICAL DEVICE WITH HIGH CAPACITY AND METHOD FOR PREPARING THE SAME

(75) Inventors: Sung Kyun Chang, Daejeon (KR); Eui Yong Bang, Daejeon (KR); Min Chul Jang, Daejeon (KR); Sang Hoon Choy, Daejeon (KR); Ki Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,698

(22) Filed: May 11, 2012

(65) Prior Publication Data

US 2012/0251883 A1    Oct. 4, 2012

Related U.S. Application Data

(63) Continuation of application No. 11/506,357, filed on Aug. 18, 2006, now Pat. No. 8,241,773.

(30) Foreign Application Priority Data

Aug. 19, 2005  (KR) .................. 10-2005-0076488

(51) Int. Cl.
*H01M 10/34* (2006.01)
*H01M 10/52* (2006.01)
(Continued)

(52) U.S. Cl.
CPC ............ *H01M 4/1391* (2013.01); *H01M 4/131* (2013.01); *H01M 4/505* (2013.01); *H01M 4/525* (2013.01); *H01M 10/052* (2013.01); *Y02E 60/122* (2013.01)

(58) Field of Classification Search
USPC ........ 429/57, 223, 224, 231.5, 231.95, 623.1; 29/623.1; 320/137
See application file for complete search history.

(56) References Cited

U.S. PATENT DOCUMENTS 678,232 A     7/1901  Ekman
5,250,158 A *  10/1993  Kaneko et al. ................. 205/538
(Continued)

FOREIGN PATENT DOCUMENTS

CN     1348229 A     5/2002
CN     1430795 A     7/2003
(Continued)

OTHER PUBLICATIONS

Taiwanese Search Report for Patent Application No. 095130431; Mar. 4, 2009.
(Continued)

*Primary Examiner* — Patrick Ryan
*Assistant Examiner* — Julian Anthony
(74) *Attorney, Agent, or Firm* — Lerner, David, Littenberg, Krumholz & Mentlik, LLP (57) ABSTRACT

Disclosed is a method for preparing an electrochemical device, comprising the steps of: charging an electrochemical device using an electrode active material having a gas generation plateau potential in a charging period to an extent exceeding the plateau potential; and degassing the electrochemical device. An electrochemical device, which comprises an electrode active material having a gas generation plateau potential in a charging period, and is charged to an extent exceeding the plateau potential and then degassed, is also disclosed.

20 Claims, 3 Drawing Sheets (51) Int. Cl.
| | |
|---|---|
| *H01M 4/00* | (2006.01) |
| *H01M 4/13* | (2010.01) |
| *H01M 4/60* | (2006.01) |
| *H01M 4/58* | (2010.01) |
| *H01M 4/82* | (2006.01) |
| *H01M 6/00* | (2006.01) |
| *H01M 4/1391* | (2010.01) |
| *H01M 4/131* | (2010.01) |
| *H01M 4/505* | (2010.01) |
| *H01M 4/525* | (2010.01) |
| *H01M 10/052* | (2010.01) |

(56) References Cited

U.S. PATENT DOCUMENTS

| | | |
|---|---|---|
| 6,534,216 B1 | 3/2003 | Narukawa et al. |
| 6,803,149 B2 | 10/2004 | Nakai et al. |
| 7,438,993 B2 | 10/2008 | Shin et al. |
| 7,582,383 B2 | 9/2009 | Kasai et al. |
| 7,718,318 B2 | 5/2010 | Ohzuku et al. |
| 7,771,874 B2 | 8/2010 | Gao et al. |
| 2002/0122973 A1 | 9/2002 | Manev et al. |
| 2003/0108793 A1 | 6/2003 | Dahn et al. |
| 2003/0138699 A1 | 7/2003 | Kweon et al. |
| 2004/0185345 A1 | 9/2004 | Kawasaki et al. |
| 2008/0096111 A1 | 4/2008 | Ohzuku et al. |

FOREIGN PATENT DOCUMENTS

| | | |
|---|---|---|
| CN | 1545743 A | 11/2004 |
| CN | 1595689 A | 3/2005 |
| JP | H08-273665 A | 10/1996 |
| JP | 2000-195513 A | 7/2000 |
| JP | 2000-215884 A | 8/2000 |
| JP | 2001-351626 A | 12/2001 |
| JP | 2002-216851 A | 8/2002 |
| JP | 2003-187855 A | 7/2003 |
| JP | 2003-217572 A | 7/2003 |
| JP | 2003-331916 A | 11/2003 |
| JP | 2004-258691 A | 9/2004 |
| JP | 2004-538610 A | 12/2004 |
| KR | 20030063930 A | 7/2003 |
| TW | 431012 | 4/2001 |
| TW | 565017 | 12/2003 |
| TW | 200707827 | 2/2007 |
| WO | 02089234 | 11/2002 |

OTHER PUBLICATIONS

International Search Report; PCT/KR2006/003239; Dec. 4, 2006.
International Search Report for International Application No. PCT/KR02006/002846 dated Nov. 27, 2006.

* cited by examiner

# ELECTROCHEMICAL DEVICE WITH HIGH CAPACITY AND METHOD FOR PREPARING THE SAME

This application is a continuation of U.S. application Ser. No. 11/506,357, filed on Aug. 18, 2006, now issued as U.S. Pat. No. 8,241,773, which claims priority to Korean Patent Application No. 10-2005-0076488, filed on Aug. 19, 2005, and all the benefits accruing therefrom under 35 U.S.C. 119, the content of which is herein incorporated by reference in its entirety.

TECHNICAL FIELD

The present invention relates to an electrochemical device that utilizes an electrode active material having a gas generation plateau potential i.e. plateau potential where gas generation occurs) in a charging period. Also, the present invention relates to a method for preparing the same electrochemical device.

BACKGROUND ART

As the mobile communication industry and the information electronic industry have been developed markedly in recent years, lithium secondary batteries with high capacity and low weight have been increasingly in demand. However, since mobile instruments have become more multi-functionalized, energy consumption thereof increases, and thus batteries used in such instruments as drive sources have been required to be provided with higher power and capacity. Additionally, active and intensive research and development have been conducted to substitute cobalt (Co), which is expensive and limited in supply, with inexpensive nickel (Ni), manganese (Mn), iron (Fe) or the like.

However, $LiMn_2Co_4$ provides a lower battery capacity when compared to $LiCoO_2$ by about 20% and shows a problem of Mn dissolution at higher temperature. Additionally, $LiNiO_2$ provides an improved energy density when compared to $LiCoO_2$, but shows a safety-related problem. Further, $LiFePO_4$ provides a lower capacity when compared to $LiCoO_2$ by about 20% and shows a problem related to C-rate characteristics.

In the case of an electrode active material having a gas generation plateau potential in a charging period, there has been the following problem: when a battery is charged to such an extent that gas generation does not occur yet, the battery shows a low capacity, and when a battery is charged to such an extent that gas generation occurs, the battery itself cannot be realized due to the gas generation.

DISCLOSURE OF THE INVENTION

Therefore, the present invention has been made in view of the above-mentioned problems. The inventors of the present invention have conducted many studies and have found that charging to an extent exceeding the gas generation plateau potential upon the first charge cycle (initial charge cycle) causes generation of a great amount of gas, however, the subsequent charge cycles cause no generation of a great amount of gas even when they are performed to an extent exceeding the plateau potential. The present invention is based on this finding.

It is an object of the present invention to solve the problems of a change in appearance of an electrochemical device and degradation in cycle life characteristics and C-rate characteristics of an electrochemical device caused by the gas generation, by carrying out a degassing step after the electrochemical device is charged to an extent exceeding the gas generation plateau potential. It is another object of the present invention to provide an electrochemical device having an increased capacity by being charged to an extent exceeding the gas generation plateau potential from the second charge cycle.

According to an aspect of the present invention, there is provided a method for preparing an electrochemical device, comprising the steps of: charging an electrochemical device using an electrode active material having a gas generation plateau potential in a charging period to an extent exceeding the plateau potential; and degassing the electrochemical device.

According to another aspect of the present invention, there is provide an electrochemical device comprising an electrode active material having a gas generation plateau potential in a charging period, the electrochemical device being charged to an extent exceeding the plateau potential and then degassed.

Preferably, charging to an extent exceeding the plateau potential is performed at the first charge cycle.

Hereinafter, the present invention will be explained in more detail.

The electrochemical device according to the present invention is characterized by the fact that it is charged to an extent exceeding the plateau potential and then degassed.

In general, some electrode active materials have a certain range of plateau potential beyond the oxidation/reduction potentials defined by variations in oxidation numbers of the constitutional elements of the electrode active materials during charge/discharge cycles.

Such electrode active materials generally generate oxygen in the range of plateau potential. This serves to stabilize materials showing instability caused by an increase in voltage. In other words, upon the first charge cycle, Li is deintercalated not by oxidation/reduction of a transition metal forming the electrode active material but by the liberation of oxygen. When oxygen is liberated, charge balance is not made between oxygen and metals in the structure of the material, and thus Li deintercalation occurs to solve this problem. Such deintercalated Li may be intercalated back into a cathode while the transition metal (e.g. Mn) forming the electrode active material experiences a change in its oxidation number from 4+ to 3+ upon discharge. In other words, after the aforementioned $O_2$ defect is generated (i.e. the electrode active material is activated), the charge/discharge cycles can be accomplished via oxidation/reduction of the transition metal forming the electrode active material. Herein, although the transition metal (e.g. Mn), reduced from an oxidation number 4+ to an oxidation number of 3+, does not participate in lithium (Li) intercalation/deintercalation upon the first charge cycle, it may participate in charge/discharge after the first charge cycle, thereby increasing reversible capacity.

Therefore, the gas generation plateau potential exists at a higher level than the redox potential of the transition metal forming the electrode active material.

As described above, electrode active materials having a certain range of plateau potential in a charging period, where gas (e.g. oxygen) generation occurs, generate a great amount of gas only in the first charge cycle performed to an extent exceeding the plateau potential. Thus, after the gas generated in the first charge cycle is removed, the problem of generation of a great amount of gas can be solved even if the electrochemical device is charged to an extent exceeding the plateau potential during the subsequent charge/discharge cycles. Therefore, according to the present invention, when the first charge cycle is performed to an extent exceeding the plateau potential, and then a degassing step is performed, it is possible to increase the capacity of an electrochemical device, with no generation of a great amount of gas, by performing the second and the subsequent charge/discharge cycles to an extent exceeding the gas generation plateau potential.

Figure 5:
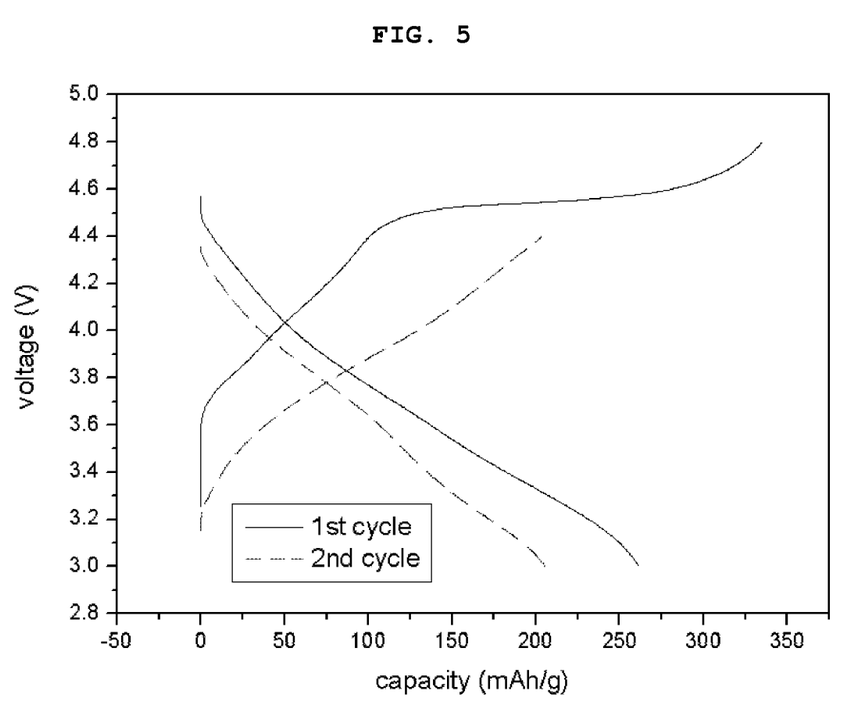
FIG. 5 is a graph illustrating charge/discharge characteristics of the battery charged according to Example 4, in a voltage range of 3~4.8V upon the first cycle, and in a voltage range of 3~4.4V from the second cycle.

Further, even when a charging voltage is reduced in the 2nd and subsequent charging/discharging cycle after the electrochemical device is charged to an extent exceeding the plateau potential in the 1st charging cycle, the electrochemical device shows a markedly increased capacity as compared to the same electrochemical device that is not charged to an extent exceeding the plateau potential in the 1st charging cycle(see FIG. 5).

In general, it is thought that the electrode active material has an activated structure with lithium deficiency in the range of the plateau potential, thereby generating gas in addition to an irreversible phase transition.

Figure 3:
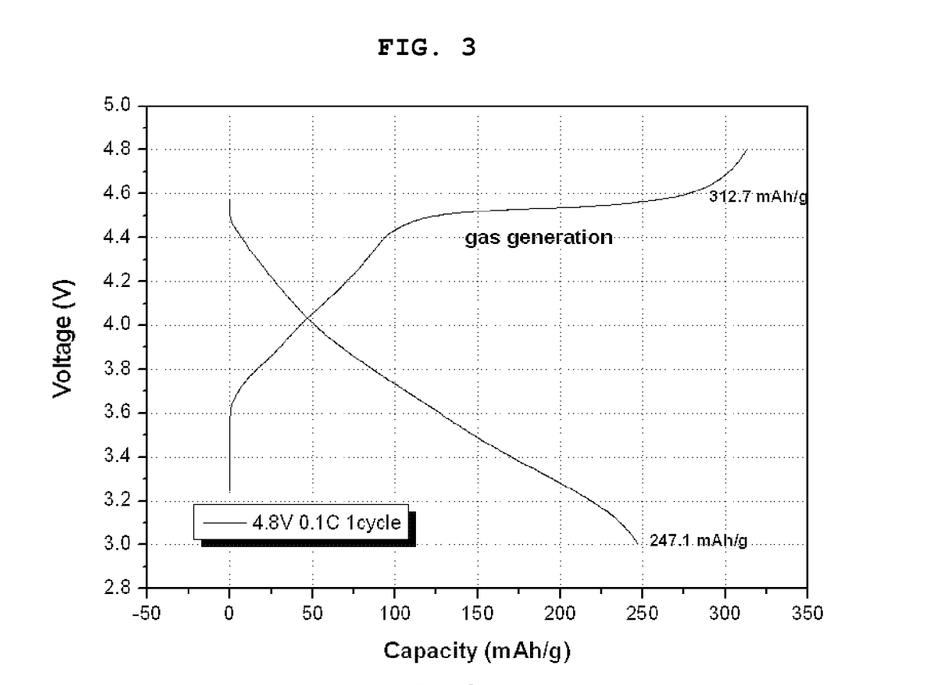
FIG. 3 is a graph illustrating charge/discharge characteristics of the battery charged according to Example 2 in a voltage range of 3~4.8V.
Figure 4:
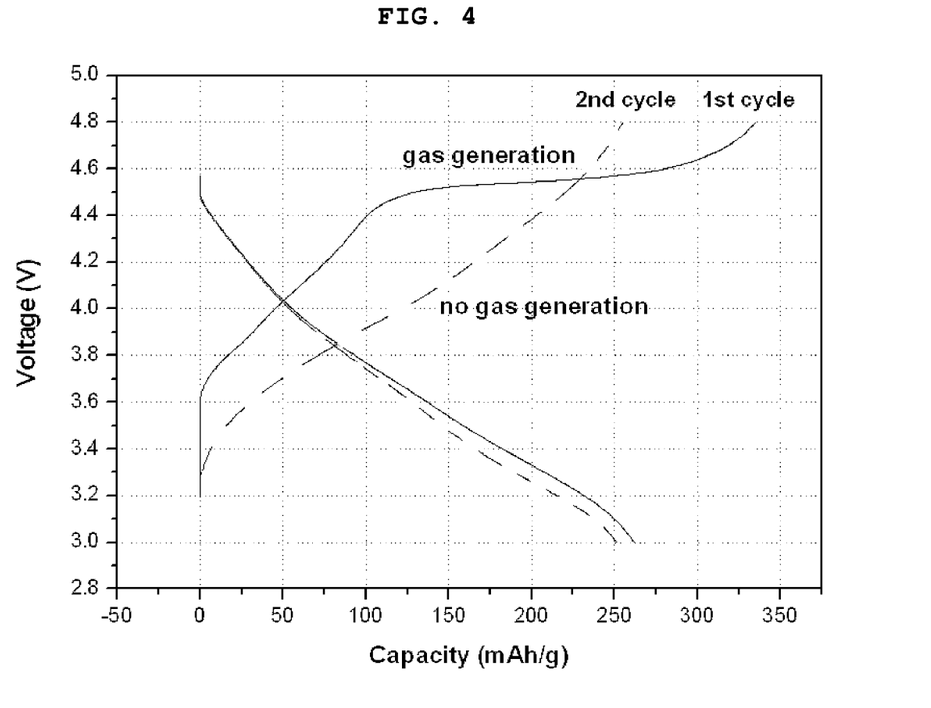
FIG. 4 is a graph illustrating charge/discharge characteristics of the battery charged according to Example 3 in a voltage range of 3~4.8V upon the second cycle.

When a battery using a compound represented by the following Formula 1 as a cathode active material is subjected to charge/discharge cycles, a plateau appears at 4.4~4.6V upon the first charge cycle and a great amount of gas is generated in the plateau potential (see FIGS. 3 and 4).

In other words, in order to allow the electrode active material represented by the following Formula 1 to provide high capacity characteristics, the battery using the electrode active material should be charged to an extent exceeding the plateau potential so that the electrode active material is activated and structurally modified. However, in this case, there is a problem of gas generation.

Such gas generation causes a change in appearance of a battery, and reduces adhesion in an electrode to adversely affect charge/discharge uniformity of the electrode, resulting in degradation in cycle life characteristics due to the generation of Li-containing byproducts. Additionally, since the gas generation causes an increase in the gap between electrodes, C-rate characteristics are degraded by an increase in impedance, overvoltage, or the like. In brief, such gas generation adversely affects the overall quality of a battery.

Meanwhile, if the battery is charged to an extent not exceeding the plateau potential, it is not possible to obtain high capacity characteristics provided by the electrode active material represented by Formula 1.

According to the present invention, the aforementioned problems occurring in a battery due to the gas generation can be solved, and the battery with high capacity can be obtained by charging a battery to an extent exceeding the plateau potential at least once, and then by degassing the battery, even if it is continuously charged to an extent exceeding the plateau potential. In other words, once the battery is charged to an extent exceeding the plateau potential, gas generation does not occur any longer and the plateau disappears (see FIG. 4).

Further, as mentioned hereinbefore, the battery charged to an extent exceeding the plateau potential at least once and then degassed, shows an increased capacity even when it is subsequently charged to an extent not exceeding the plateau potential, as compared to a battery that has not been charged to an extent exceeding the plateau potential (see FIG. 5).

More particularly, the electrode active material includes a solid solution represented by the following Formula 1:

$$XLi(Li_{1/3}M_{2/3})O_2+YLiM'O_2 \quad \text{[Formula 1]}$$

Wherein M is at least one element selected from the group consisting of metals having an oxidation number of 4+;

M' is at least one element selected from transition metals; and

0<X<1 and 0<Y<1, with the proviso that X+Y=1.

When the electrode active material is subjected to a charge cycle at a potential level higher than the redox potential of M', Li is deintercalated from the electrode active material while oxygen is also deintercalated to correct the redox valence. In this manner, the electrode active material shows a plateau potential.

The compound represented by Formula 1 is preferred, because it still serves as a stable electrode active material during the subsequent charge/discharge cycles after carrying out a charging step to a voltage (4.4~4.8V) higher than the plateau potential and a degassing step.

Preferably, M is at least one element selected from the group consisting of Mn, Sn and Ti metals, and M' is at least one element selected from the group consisting of Ni, Mn, Co and Cr metals.

When an electrochemical device using the electrode active material comprising the compound represented by Formula 1 is charged to an extent exceeding the plateau potential at least once and then degassed, the electrochemical device can have a discharge capacity of 100~280 mAh/g, preferably 170~250 mAh/g in a voltage range of 3.0~4.4V. When the electrochemical device is not charged as described above, it shows a discharge capacity of approximately 90 mAh/g in the same voltage range. Therefore, the electrochemical device according to the present invention shows a significantly increased capacity (see FIG. 5).

In addition, when the electrochemical device using the electrode active material comprising the compound represented by Formula 1 is charged to an extent exceeding the plateau potential at least once and then degassed, the electrochemical device can have a discharge capacity of 100~350 mAh/g, preferably 200~280 mAh/g in a voltage range of 3.0~4.8V (see FIG. 4).

Hereinafter, the electrochemical device obtained by removing the gas generated upon the initial charge cycle performed to an extent exceeding the gas generation plateau potential will be explained in more detail.

Preferably, the electrochemical device according to the present invention is a lithium ion battery.

In general, a lithium ion battery comprises a cathode having cathode active material slurry and a cathode collector, an anode having anode active material slurry and an anode collector, and a separator interposed between both electrodes in order to interrupt electron conduction and to perform lithium ion conduction between both electrodes. Also, a lithium salt-containing organic electrolyte is injected into the void of the electrodes and the separator.

The electrode active material used in the lithium ion battery is an electrode active material that generates a great amount of gas upon the initial charge cycle performed to an extent exceeding the plateau potential while generating no gas and having no plateau potential from the second charge cycle. For example, the electrode active material is a cathode active material represented by Formula 1, which may be used alone or in combination with at least one cathode active material selected from the following group of cathode active materials to provide a cathode: $LiCoO_2$, $LiNiO_2$, $LiMnO_2$, $LiMn_2O_4$, $Li(Ni_aCo_bMn_c)O_2$ (wherein 0<a<1, 0<b<1, 0<c<1, and a+b+c=1), $LiNi_{1-Y}Co_YO_2$, $LiCo_{1-Y}Mn_YO_2$, $LiNi_{1-Y}Mn_YO_2$ (wherein 0≤Y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (wherein 0<Z<2). $LiCoPO_4$, and $LiFePO_4$.

For example, the cathode can be obtained by applying a mixture containing the above-described cathode active material, a conductive agent and a binder onto a cathode collector, followed by drying. If desired, the mixture may further comprise fillers.

The cathode collector generally has a thickness of 3~500 µm. There is no particular limitation in the cathode collector, as long as it has high electrical conductivity while not causing any chemical change in the battery using it. Particular examples of the cathode collector that may be used in the present invention include stainless steel, aluminum, nickel, titanium, sintered carbon, or aluminum or stainless steel surface-treated with carbon, nickel, titanium, silver or the like. The collector may have fine surface roughness to increase the adhesion of the cathode active material thereto, and may be formed into various shapes, including a film, sheet, foil, net, porous body, foamed body, non-woven body, or the like.

Generally, the conductive agent is added to the mixture containing the cathode active material in an amount of 1~50 wt % based on the total weight of the mixture. There is no particular limitation in the conductive agent, as long as it has electrical conductivity while not causing any chemical change in the battery using it. Particular examples of the conductive agent that may be used in the present invention include: graphite such as natural graphite or artificial graphite; carbon black such as carbon black, acetylene black, ketjen black, channel black, furnace black, lamp black, thermal black, etc.; conductive fiber such as carbon fiber or metal fiber; metal powder such as fluorocarbon, aluminum, nickel powder, etc.; conductive whisker such as zinc oxide, potassium titanate, etc.; conductive metal oxides such as titanium oxide; and other conductive materials such as polyphenylene derivatives.

The binder helps binding between the active material and the conductive agent or the like and binding of the active material to the collector. Generally, the binder is added to the mixture containing the cathode active material in an amount of 1~50 wt % based on the total weight of the mixture. Particular examples of the binder that may be used in the present invention include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber, fluororubber, various copolymers, or the like.

The fillers are used optionally in order to prevent the cathode from swelling. There is no particular limitation in the fillers, as long as they are fibrous material while not causing any chemical change in the battery using them. Particular examples of the fillers that may be used in the present invention include olefin polymers such as polyethylene, polypropylene, etc.; and fibrous materials such as glass fiber, carbon fiber, etc.

The anode can be obtained by applying a mixture containing an anode active material onto an anode collector, followed by drying. If desired, the mixture may further comprise the additives as described above.

The anode collector generally has a thickness of 3~500 µm. There is no particular limitation in the anode collector, as long as it has electrical conductivity while not causing any chemical change in the battery using it. Particular examples of the anode collector that may be used in the present invention include copper, stainless steel, aluminum, nickel, titanium, sintered carbon, copper or stainless steel surface-treated with carbon, nickel, titanium, silver, etc., aluminum-cadmium alloy, or the like. Additionally, like the cathode collector, the anode collector may have fine surface roughness to increase the adhesion of the anode active material thereto, and may be formed into various shapes, including a film, sheet, foil, net, porous body, foamed body, non-woven body, or the like.

Particular examples of the anode active material that may be used in the present invention include: carbon such as hard carbon or graphitized carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (wherein Me represents Mn, Fe, Pb or Ge; Me' represents Al, B, P, Si, a Group I, II or III element in the Periodic Table or a halogen atom; $0 < x \leq 1$; $1 \leq y \leq 3$; and $1 \leq z \leq 8$); lithium metal; lithium alloy; silicon alloy; tin alloy; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials.

The separator is interposed between the cathode and the anode, and includes a thin film having insulation property and showing high ion permeability and mechanical strength. The separator generally has a pore diameter of 0.01~10 µm and a thickness of 5~300 µm. Particular examples of the separator that may be used in the present invention include: olefin polymers such as polypropylene with chemical resistance and hydrophobicity; and sheets or non-woven webs formed of glass fiber or polyethylene. When a solid electrolyte such as a polymer electrolyte is used, the solid electrolyte may serve also as a separator.

The non-aqueous electrolyte includes a cyclic carbonate and/or linear carbonate as an electrolyte compound. Particular examples of the cyclic carbonate include ethylene carbonate (EC), propylene carbonate (PC), gamma-butyrolactone (GBL), or the like. Preferably, the linear carbonate is selected from the group consisting of diethyl carbonate (DEC), dimethyl carbonate (DMC), ethyl methyl carbonate (EMC) and methyl propyl carbonate (MPC), but is not limited thereto. Additionally, the non-aqueous electrolyte further comprises a lithium salt in addition to the carbonate compound. Preferably, the lithium salt is selected from the group consisting of $LiClO_4$, $LiCF_3SO_3$, $LiPF_6$, $LiBF_4$, $LiAsF_6$ and $LiN(CF_3SO_2)_2$, but is not limited thereto.

The lithium ion battery according to the present invention is manufactured by introducing a porous separator between a cathode and an anode and injecting a non-aqueous electrolyte thereto in a conventional manner.

The lithium ion battery according to the present invention may have any outer shape, such as a cylindrical shape, a prismatic shape, a pouch-like shape, or the like.

BRIEF DESCRIPTION OF THE DRAWINGS

The foregoing and other objects, features and advantages of the present invention will become more apparent from the following detailed description when taken in conjunction with the accompanying drawings in which.

MODE FOR CARRYING OUT THE INVENTION

Reference will now be made in detail to the preferred embodiments of the present invention. It is to be understood that the following examples are illustrative only, and the scope of the present invention is not limited thereto.

Example 1

Cathode active material slurry was formed by using $Li(Li_{0.2}Ni_{0.2}Mn_{0.6})\ O_2$ ($\frac{3}{5}[Li(Li_{1/3}Mn_{2/3})O_2]+\frac{2}{5}[LiNi_{1/2}Mn_{1/2}]O_2$) as a cathode active material and mixing the cathode active material with carbon as a conductive agent and PVDF as a binder in a weight ratio of 88:6:6. The cathode active material slurry was coated on Al foil having a thickness of 15 μm to provide a cathode. Artificial graphite was used as an anode active material and 1M $LiPF_6$ solution in EC:EMC (weight ratio 1:2) was used as an electrolyte to provide a pouch type battery.

The battery was charged to 4.8V upon the first charge cycle, and degassed. After the battery was subjected to the second charge cycle, the battery was measured for its volumetric change.

Comparative Example 1

The battery obtained in the same manner as described in Example 1 was charged to 4.2V upon the first charge cycle, with no subsequent degassing step. Then, the battery was measured for its volumetric change.

Comparative Example 2

The battery obtained in the same manner as described in Example 1 was charged to 4.4V upon the first charge cycle, with no subsequent degassing step. Then, the battery was measured for its volumetric change.

Comparative Example 3

The battery obtained in the same manner as described in Example 1 was charged to 4.8V upon the first charge cycle, with no subsequent degassing step. Then, the battery was measured for its volumetric change.

Comparative Example 4

The battery obtained in the same manner as described in Example 1 was charged to 4.8V upon the first charge cycle, with no subsequent degassing step. After the battery was subjected to the second charge cycle, the battery was measured for its volumetric change.

The following Table 1 shows the swelling degree of each of the batteries according to Example 1 and Comparative Examples 1~4, in the charged voltage of each battery after the first or the second cycle.

TABLE 1

|  | Charged voltage | Initial thickness (mm) | Thickness after charge (mm) | Thickness change (mm) |
| --- | --- | --- | --- | --- |
| Ex. 1 | 4.8 V | 4.01 | 4.1 | 0.09 |
| Comp. Ex. 1 | 4.2 V | 3.98 | 4.06 | 0.08 |
| Comp. Ex. 2 | 4.4 V | 3.98 | 4.12 | 0.14 |
| Comp. Ex. 3 | 4.8 V | 4 | 5.52 | 1.52 |
| Comp. Ex. 4 | 4.8 V | 4.02 | 5.58 | 1.56 |

As can be seen from Table 1, the battery according to Example 1, which was initially charged to 4.8V and then degassed, and was measured for the thickness change after the second charge cycle, shows a swelling degree similar to that of the battery charged to about 4.2V. This indicates that when a battery is charged to 4.8V upon the first charge cycle and then degassed, there is no further generation of a great amount of gas.

Comparative Example 5

Figure 1:
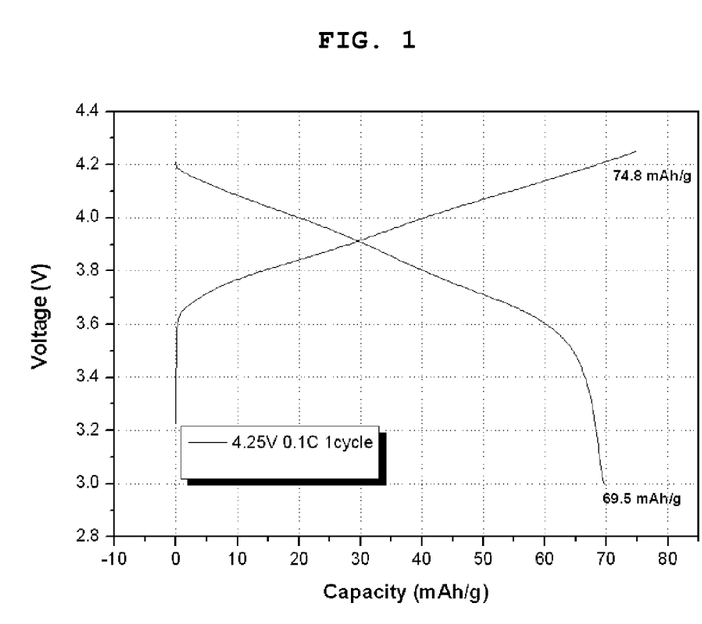
FIG. 1 is a graph illustrating charge/discharge characteristics of the battery charged according to Comparative Example 5 in a voltage range of 3~4.25V.

The cathode obtained in the same manner as described in Example 1 was used, Li metal was used as an anode, and 1M $LiPF_6$ solution in EC:EMC (weight ratio 1:2) was used as an electrolyte to provide a coin type battery. Charge/discharge capacity of the battery was observed in a voltage range of 3~4.25V (see FIG. 1)

Comparative Example 6

Figure 2:
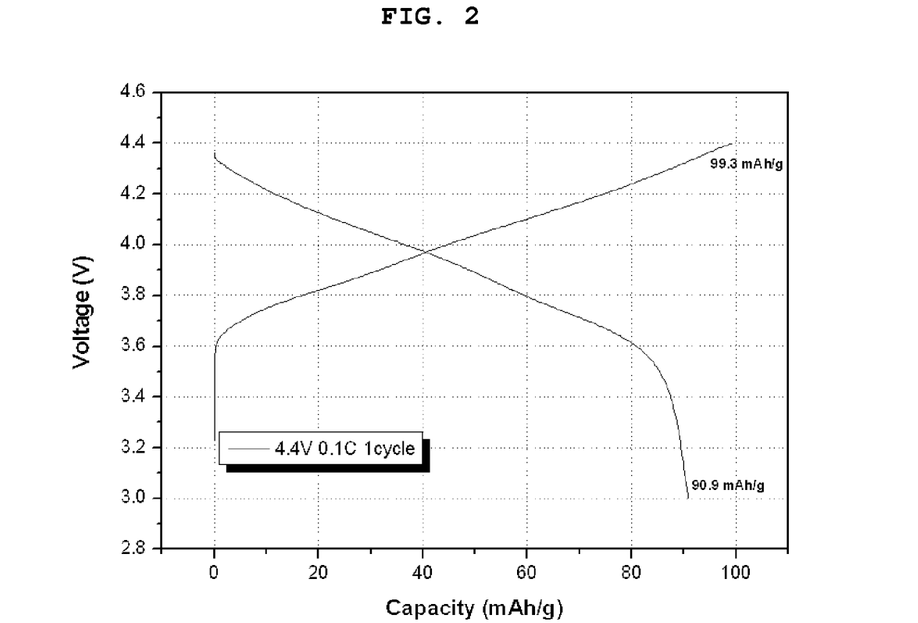
FIG. 2 is a graph illustrating charge/discharge characteristics of the battery charged according to Comparative Example 6 in a voltage range of 3~4.4V.

A battery obtained in the same manner as described in Comparative Example 5 was measured for its charge/discharge capacity, except that the battery is charged to 4.4V (see FIG. 2).

Example 2

A battery obtained in the same manner as described in Comparative Example 5 was measured for its charge/discharge capacity, except that the battery is charged to 4.8V (see FIG. 3).

Example 3

A battery obtained in the same manner as described in Comparative Example 5 was measured for its charge/discharge capacity, except that the battery is charged to 4.8V upon the second cycle as well as the first cycle (see FIG. 4).

Example 4

A battery obtained in the same manner as described in Comparative Example 5 was measured for its charge/discharge capacity, except that the battery is charged to 4.8V upon the first cycle and to 4.4V upon the second cycle (see FIG. 5).

As can be seen from FIGS. 1~4, batteries charged to a voltage exceeding the voltage of the plateau potential according to Examples 2 and 3 show a significantly increased capacity, and the plateau potential of each battery disappears at the second cycle.

INDUSTRIAL APPLICABILITY

As can be seen from the foregoing, according to the present invention, it is possible to solve the problems occurring when using an electrode active material that provides high capacity but cannot be applied to a high-capacity battery. The problems relate to gas generation, since a battery using such electrode active materials should be charged to an extent exceeding the gas generation plateau potential in order to realize a high capacity. To solve the problems, the battery is charged to an extent exceeding the plateau potential, and then degassed, according to the present invention. In other words, the present invention can solve the problems caused by the gas generation, including variations in outer shape of a battery, and degradation in cycle life characteristics and C-rate characteristics of a battery. After the first cycle, the battery can be charged to an extent exceeding the plateau potential with no further gas generation, thereby providing a significant increase in capacity.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for preparing an electrochemical device, comprising the steps of: charging an electrochemical device using an electrode active material having a gas generation plateau potential in a charging period to an extent exceeding the plateau potential during an initial charge cycle, the initial charge cycle being the first charge cycle after assembly of the electrochemical device; and degassing the electrochemical device after the plateau potential is exceeded in the initial charge cycle.

2. The method according to claim 1, wherein the electrode active material comprises a compound in a solid solution state, represented by the following Formula 1:

$$XLi(Li_{1/3}M_{2/3})O_2 + YLiM'O_2 \quad \text{[Formula 1]}$$

Wherein M is at least one element selected from the group consisting of metals having an oxidation number of 4+;
M' is at least one element selected from transition metals; and
$0 \leq x \leq 1$ and $0 \leq y \leq 1$, with the proviso that X+Y=1.

3. The method according to claim 2, wherein M is at least one element selected from the group consisting of Mn, Sn and Ti metals, and M' is at least one element selected from the group consisting of Ni, Mn, Co and Cr metals.

4. The method according to claim 3, wherein the electrode active material has a plateau potential in a range of 4.4~4.8V.

5. The method according to claim 2, wherein the electrode active material has a plateau potential in a range of 4.4~4.8V.

6. The method according to claim 1, wherein the electrode active material has a plateau potential in a range of 4.4~4.8V.

7. The method according to claim 1, wherein the gas is oxygen ($O_2$) gas.

8. An electrochemical device comprising an electrode active material having a gas generation plateau potential in a charging period, the electrochemical device being charged to an extent exceeding the plateau potential during an initial charge cycle, the initial charge cycle being the first charge cycle after assembly of the electrochemical device, and then degassed after the plateau potential has been exceeded in the initial charge cycle.

9. The electrochemical device according to claim 8, wherein the electrode active material has a plateau potential in a range of 4.4~4.8V.

10. The electrochemical device according to claim 8, wherein the electrode active material comprises a compound in a solid solution state, represented by the following Formula 1:

$$XLi(Li_{1/3}M_{2/3})O_2 + YLiM'O_2 \quad \text{[Formula 1]}$$

Wherein M is at least one element selected from the group consisting of metals having an oxidation number of 4+;
M' is at least one element selected from transition metals; and
$0 \leq x \leq 1$ and $0 \leq y \leq 1$, with the proviso that X+Y=1.

11. The electrochemical device according to claim 10, wherein M is at least one element selected from the group consisting of Mn, Sn and Ti metals, and M' is at least one element selected from the group consisting of Ni, Mn, Co and Cr metals.

12. The electrochemical device according to claim 11, which is a lithium secondary battery.

13. The electrochemical device according to claim 10, which shows a discharge capacity of 100~280 mAh/g in a voltage range of 3.0~4.4V, after being charged to an extent exceeding the plateau potential and then degassed.

14. The electrochemical device according to claim 13, which is a lithium secondary battery.

15. The electrochemical device according to claim 10, which shows a discharge capacity of 100~350 mAh/g in a voltage range of 3.0~4.8V, after being charged to an extent exceeding the plateau potential and then degassed.

16. The electrochemical device according to claim 15, which is a lithium secondary battery.

17. The electrochemical device according to claim 10, which is a lithium secondary battery.

18. The electrochemical device according to claim 8, when charged to an extent exceeding the gas generation plateau potential during a second charge cycle, wherein the second charge cycle occurs after the first charge cycle, gas generation does not occur during the second charge cycle.

19. The electrochemical device according to claim 8, being charged to an extent not exceeding the gas generation plateau potential during a second charge cycle, wherein the second charge cycle occurs after the first charge cycle.

20. The electrochemical device according to claim 8, which is a lithium secondary battery.

* * * * *

UNITED STATES PATENT AND TRADEMARK OFFICE
CERTIFICATE OF CORRECTION

PATENT NO. : 9,017,841 B2  
APPLICATION NO. : 13/469698  
DATED : April 28, 2015  
INVENTOR(S) : Sung Kyun Chang et al.

Page 1 of 1

It is certified that error appears in the above-identified patent and that said Letters Patent is hereby corrected as shown below:

Claims

Column 9, line 39, Claim 2 "$0 \leq x \leq 1$ and $0 \leq y \leq 1$" should read --$0 < x < 1$ and $0 < y < 1$--
Column 10, line 18, Claim 10 "$0 \leq x \leq 1$ and $0 \leq y \leq 1$" should read --$0 < x < 1$ and $0 < y < 1$--

Signed and Sealed this  
Twenty-eighth Day of June, 2016

Michelle K. Lee  
*Director of the United States Patent and Trademark Office*